(12) United States Patent
Park et al.

(10) Patent No.: US 12,389,892 B2
(45) Date of Patent: Aug. 19, 2025

(54) DRAG DEVICE FOR FISHING REEL USING FLUID RESISTANCE

(71) Applicant: JUHO LEPORTS CORPORATION, Gimpo-si (KR)

(72) Inventors: Woo Shik Park, Seoul (KR); Jin Gu Kim, Incheon (KR)

(73) Assignee: JUHO LEPORTS CORPORATION, Gimpo-si (KR)

( * ) Notice: Subject to any disclaimer, the term of this patent is extended or adjusted under 35 U.S.C. 154(b) by 190 days.

(21) Appl. No.: 18/039,595

(22) PCT Filed: Dec. 3, 2021

(86) PCT No.: PCT/KR2021/018263
§ 371 (c)(1),
(2) Date: May 31, 2023

(87) PCT Pub. No.: WO2022/124714
PCT Pub. Date: Jun. 16, 2022

(65) Prior Publication Data
US 2024/0000056 A1 Jan. 4, 2024

(30) Foreign Application Priority Data
Dec. 7, 2020 (KR) .......... 10-2020-0169621

(51) Int. Cl.
| A01K 89/01 | (2006.01) |
| A01K 89/0155 | (2006.01) |
| A01K 89/016 | (2006.01) |

(52) U.S. Cl.
CPC ........ A01K 89/0155 (2013.01); A01K 89/016 (2013.01)

(58) Field of Classification Search
CPC ............ A01K 89/01556; A01K 89/016; A01K 89/05; A01K 89/058; A01K 89/059
See application file for complete search history.

(56) References Cited

U.S. PATENT DOCUMENTS

| 6,065,699 A * | 5/2000 | Sacconi | A01K 89/016 |
| | | | 242/286 |
| 2004/0173705 A1* | 9/2004 | Hill | A01K 89/01908 |
| | | | 242/317 |
| 2007/0176035 A1* | 8/2007 | Campbell | A01K 89/033 |
| | | | 188/267.2 |

FOREIGN PATENT DOCUMENTS

| JP | 09-028249 A | 2/1997 |
| JP | 2016-214123 A | 12/2016 |

(Continued)

OTHER PUBLICATIONS

Search Report, mailed Mar. 24, 2022, for International Application No. PCT/KR2021/018263.

(Continued)

*Primary Examiner* — Emmanuel M Marcelo
(74) *Attorney, Agent, or Firm* — LRK PATENT LAW FIRM

(57) ABSTRACT

The invention relates to a drag device for a fishing reel utilizing fluid resistance, including: a housing (3) forming an outer body; a resistance fluid charged in a hydraulic chamber (C) within the housing (3); a rotary blade (5) rotatably embedded in the hydraulic chamber (C) with the resistance fluid; and a rotary shaft (7) rotatably supported on the housing (3), rotatably supporting the rotary blade (5) within the hydraulic chamber (C), wherein, when a rotational torque greater than that set on a spool (10) of a fishing reel axially coupled to the rotary shaft (7) is applied, the rotary blade (5) is adapted to rotate with the spool (10) in the direction of unwinding the fishing line while overcoming the fluid resistance of the resistance fluid.

8 Claims, 8 Drawing Sheets

(56) References Cited

FOREIGN PATENT DOCUMENTS

JP  2017-175933 A  10/2017
KR  10-2002-0089167 A  11/2002

OTHER PUBLICATIONS

Written Opinion, mailed Mar. 24, 2022, for International Application No. PCT/KR2021/018263.

* cited by examiner

DRAG DEVICE FOR FISHING REEL USING FLUID RESISTANCE

BACKGROUND OF THE INVENTION

Field of the Invention

The present invention relates to a drag device for a fishing reel using fluid resistance, and more particularly to a drag device for a fishing reel using fluid resistance, wherein a shear resistance to a resistive fluid on a rotary shaft connected to a spool of the fishing reel and the rotary blade is utilized to generate a drag power to resist unwinding of the reel.

Description of Related Art

In general, a drag device of a fishing reel refers to a device for braking the automatic unwinding of the fishing line of a fishing reel, and one example is a drag mechanism 101 of a fly reel applied to a fishing reel 110, such as the fly reel shown in FIG. 1.

As shown, this drag mechanism 101 is coaxially mounted on a rotational axis of a spool 111 rotatably mounted on a hub of a reel frame 113, and does not participate in rotating the spool 111 in the direction of reeling in fishing line by turning it with a handle 115, but serves to inhibit excessive release of fishing line by preventing rotation when the spool 111 attempts to rotate in the direction of unreeling fishing line with a torque greater than a drag power preset by a user.

Such a conventional drag mechanism 101 comprises a housing 121, a pivotal shaft 131 coaxially mounted inside the housing 121, and a knob 133 mounted at a rear end of the pivotal shaft 131, and is adapted to adjust the drag force by changing the adhesion force between the pressure plate 123, the drag washer 125, and the drag disk 127 by rotation of the knob 133, wherein adhesion is defined as the attractive force between two objects.

However, the drag mechanism 101 utilizes the friction force between the pressure plate 123 and the rigid bodies such as the drag washer 125 and the drag disk 127 to generate the drag power as described above, and since the wear of these rigid bodies occurs rapidly due to the braking friction, there is a problem that the usable life is short and damage or failure is easily caused.

In addition, the structure of generating drag power by generating friction between rigid bodies is complex, which increases the production unit cost and makes maintenance difficult.

In addition, if the drag power is set to the maximum, the drag power generation or release becomes rigid, so that the fishing line does not unwind even if it is pulled strongly and may break or even break the fishing rod, and conversely, if the drag power is set to the minimum, the drag power cannot be generated.

SUMMARY OF THE INVENTION

The present invention is proposed to solve the above problems of a conventional drag device for a fishing reel. In applying a brake to a spool of a fishing reel so that the fishing reel is not unwound for a pulling force with a torque smaller than a drag power set by a user, that is, a force resisting the unwinding of the fishing reel, and is unwound only when the pulling force is greater than the set drag power, the rotational resistance to the resistive fluid of a rotary blade connected to the spool is utilized as a drag power, thereby greatly reducing the frictional resistance generated inside the device when dragging, reducing damage or failure of the device, and thus increasing its usable life.

Another purpose is to improve drag performance by allowing a strongly pulled fishing line to gradually unwind when the spool's rotational acceleration is reduced, even if the drag power that brakes the spool's rotation is set to, for example, maximum, thus reducing drag stiffening.

To accomplish these objectives, the present invention provides a drag device for a fishing reel utilizing fluid resistance comprising: a housing forming an outer body; a resistive fluid charged in a hydraulic chamber within the housing; a rotary blade rotatably embedded with the resistive fluid in the hydraulic chamber; and a rotary shaft rotatably supported on the housing, for rotatably supporting the rotary blade within the hydraulic chamber, wherein when a rotational torque greater than a predetermined drag power is applied to a spool of the fishing reel axially coupled to the rotary shaft, the rotary blade is rotated with the spool in a direction to unwind the fishing line while overcoming the fluid resistance of the resistive fluid.

Furthermore, the rotary blade is preferably adapted to set a drag power resisting the unwinding of the spool by adjusting an angle of attack.

Further, the rotary blade preferably comprises a knob mounted on one side of the housing to be engaged at one end of the rotary shaft, for adjusting the angle of attack of the rotary blade when rotated by an external force.

Further, the rotary shaft preferably comprises an outer shaft extending along an axis of the rotary shaft, rotatably supported on the housing at both ends, so that a once is exposed out of the housing toward the spool; an inner shaft inserted within the outer shaft for reciprocal movement along the axis by the knob connected to the once on the opposite side of the spool; and a wing pivot rotatably mounted in the middle of the outer shaft, one side connected to the wing root and the other side connected to the inner shaft.

Also, the knob comprising: a body screwed to a periphery of the spool-opposing side of the housing, which moves back and forth along the axis upon reverse rotation; a flange bearing, fitted in a center of the body, rotatably supporting the inner shaft portion relative to the body; and a retainer, preferably mounted at an end of the inner shaft to permit relative rotation of the inner shaft about the flange bearing, but to constrain axial relative movement of the inner shaft, so as to cause the inner shaft to move back and forth relative to the outer shaft in coordination with back and forth movement of the body.

Further, the wing pivot is preferably adapted to rotate by the inner shaft as the inner shaft moves relative to the outer shaft, thereby converting linear motion of the inner shaft into rotational motion of the rotary blade, thereby varying the angle of attack of the rotary blade.

Furthermore, it is preferred that the resistive fluid is a viscous fluid.

Advantageous Effects of the Invention

According to the drag device of a fishing reel utilizing fluid resistance of the present invention, a drag power is generated between a rotary blade of a rotary shaft connected to a spool and a resistive fluid surrounding it in a hydraulic chamber by the shear resistance of the resistive fluid generated when the rotary blade rotates, so that the frictional resistance generated inside the device can be greatly reduced, and thus the damage or failure of the device can be greatly reduced, as well as the usable life can be greatly increased.

Furthermore, the angle of the rotary blades with respect to the axis of rotation, i.e., the angle of attack, can be changed by simply turning a knob, and thus the drag power on the spool can be easily adjusted.

Furthermore, since the mechanism for adjusting the drag power is accomplished by a simple mechanism for adjusting the angle of the rotary blade and the angle of attack of the rotary blade, the production cost of the device can be lowered, and maintenance and other operations can be made very convenient.

In addition, the release of the drag power when a force greater than the preset is applied to the fishing line and the generation of the drag power when a force less than the preset is applied to the fishing line are not rigidly performed, so that a sudden impact is not generated on the entire gear including the fishing line, thereby reducing damage or failure of the gear.

Also, even if the drag force on the spool is set high, if the rotational acceleration does not increase rapidly in a situation where the fishing line is pulled harder than set, the spool can be rotated gradually to loosen the fishing line little by little, so that the stiffness of the drag can be mitigated, and thus the drag performance can be greatly improved.

DETAILED DESCRIPTION OF THE PREFERRED EMBODIMENTS

Hereinafter, a drag device for a fishing reel utilizing fluid resistance according to one embodiment of the present invention will be described in detail with reference to the accompanying drawings.

Figure 1:
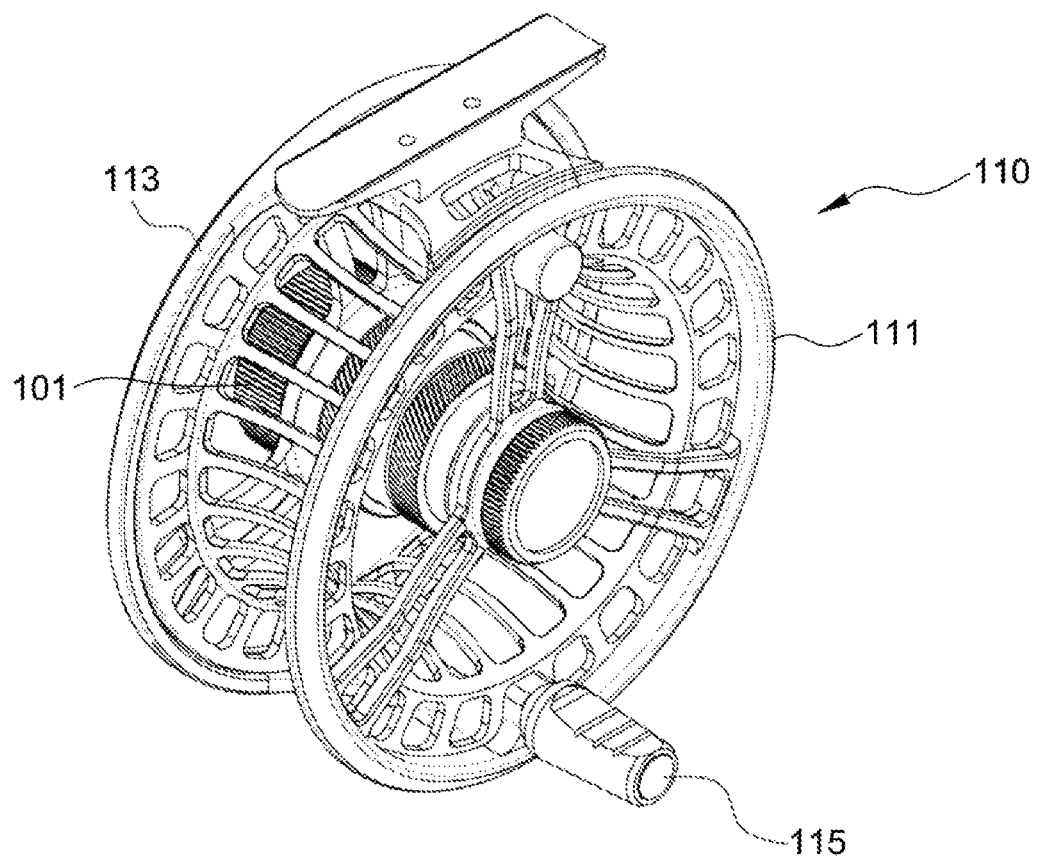
FIG. 1 is a schematic perspective view of a fishing reel with a conventional drag device.
Figure 2:
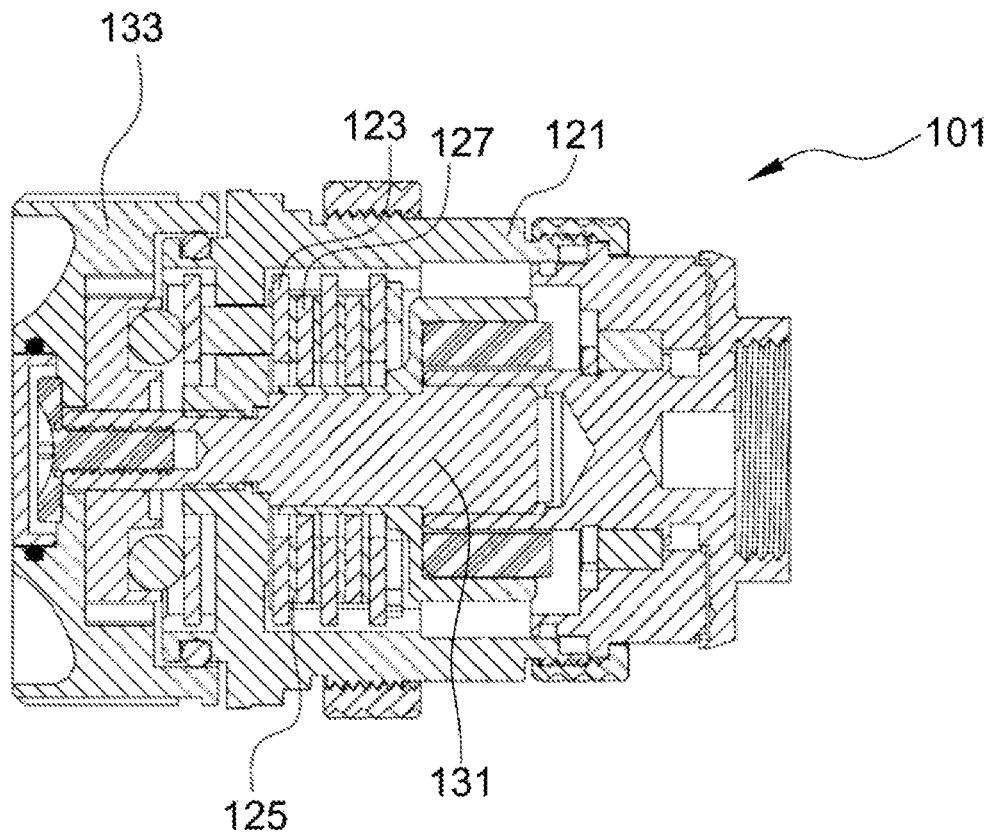
FIG. 2 is a longitudinal perspective view of the drag device of FIG. 1.
Figure 3:
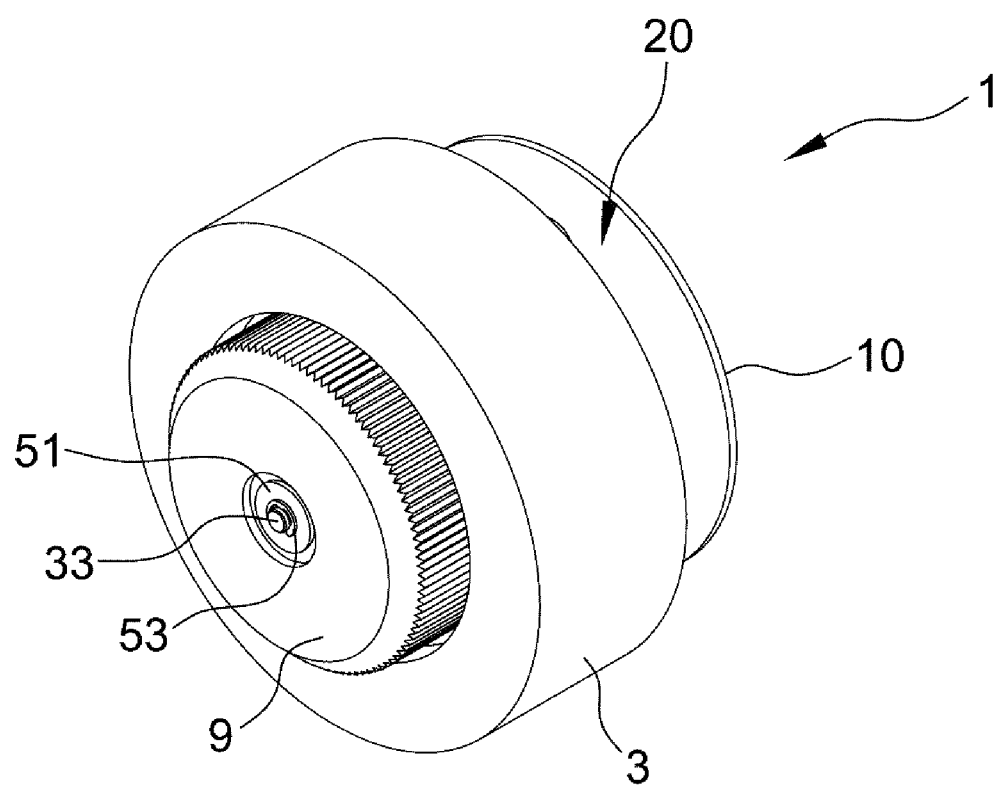
FIG. 3 is a schematic exterior perspective view of a drag device according to one embodiment of the present invention.
Figure 4:
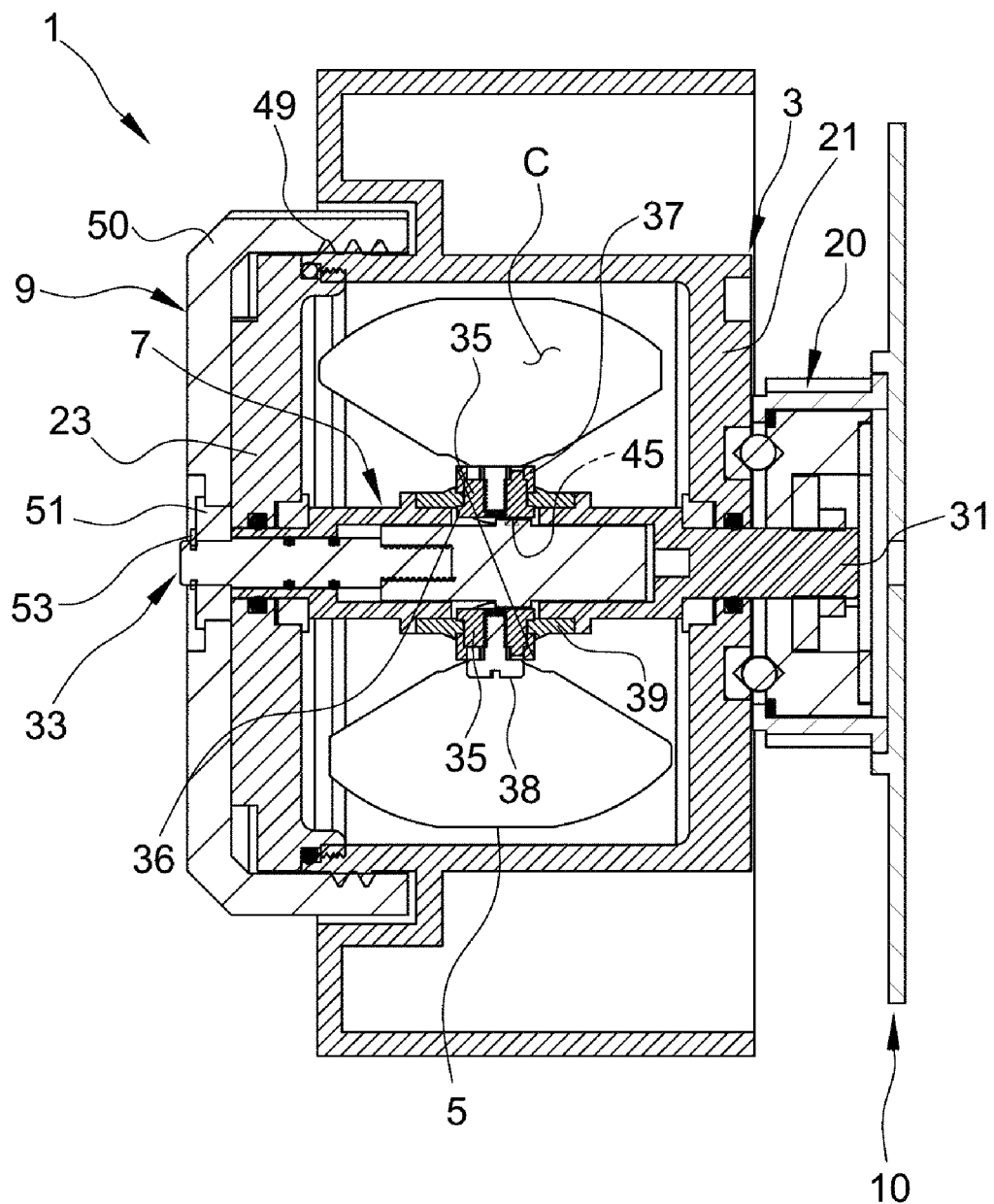
FIG. 4 is a longitudinal perspective view of FIG. 3.

The drag device of the present invention comprises a housing 3, a resistive fluid, a rotary blade 5, and a rotary shaft 7, as illustrated in FIGS. 3 and 4 with a drawing symbol 1.

Figure 5:
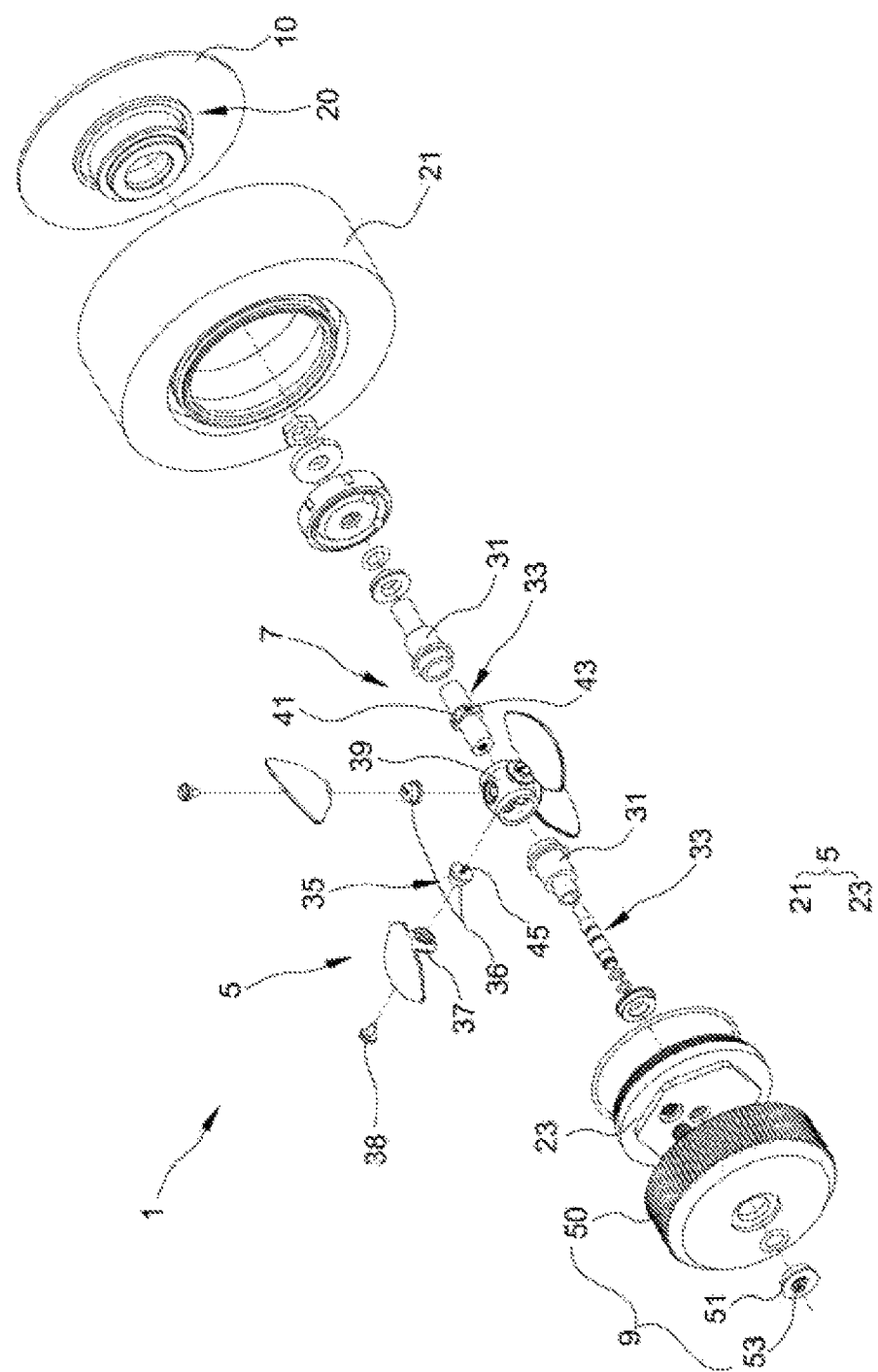
FIG. 5 is an exploded perspective view of FIG. 3.

Here, the housing 3 is the part forming the outer body of the drag device 1 and is a hollow cylindrical bar, as shown in FIGS. 3 and 4, having a structure capable of opening an internal hydraulic chamber C, so as to accommodate the resistive fluid, the rotary blade 5 and the rotary shaft 7. In the present embodiment, the housing 3 comprises a body 21 and a lid 23, as shown in FIGS. 4 and 5, which can be opened from the inside. In this case, the hydraulic chamber C has an overall cylindrical shape, as shown in FIG. 4.

The resistive fluid is an element that causes resistance to the rotation of the rotary blade 5, and is charged in the hydraulic chamber C inside the housing 3 as shown in FIG. 4, and is preferably a viscous fluid having a viscosity sufficient to prevent the rotary blade 5 from rotating when the pulling force is less than the drag power set by the user, even if the fishing line is pulled.

In particular, when the rotary blade 5 is disposed circumferentially with four of them spaced 90 degrees apart as in the present embodiment, the rotary blade 5 exhibits maximum shear resistance to the resistive fluid, as shown in FIG. 4, when the angle of attack of the rotary blade 5 is maximized, for example, to 90 degrees, the rotary blade 5 exhibits maximum shear resistance to the resistive fluid, as shown in FIG. 4, and thus generate the highest drag power.

Figure 7:
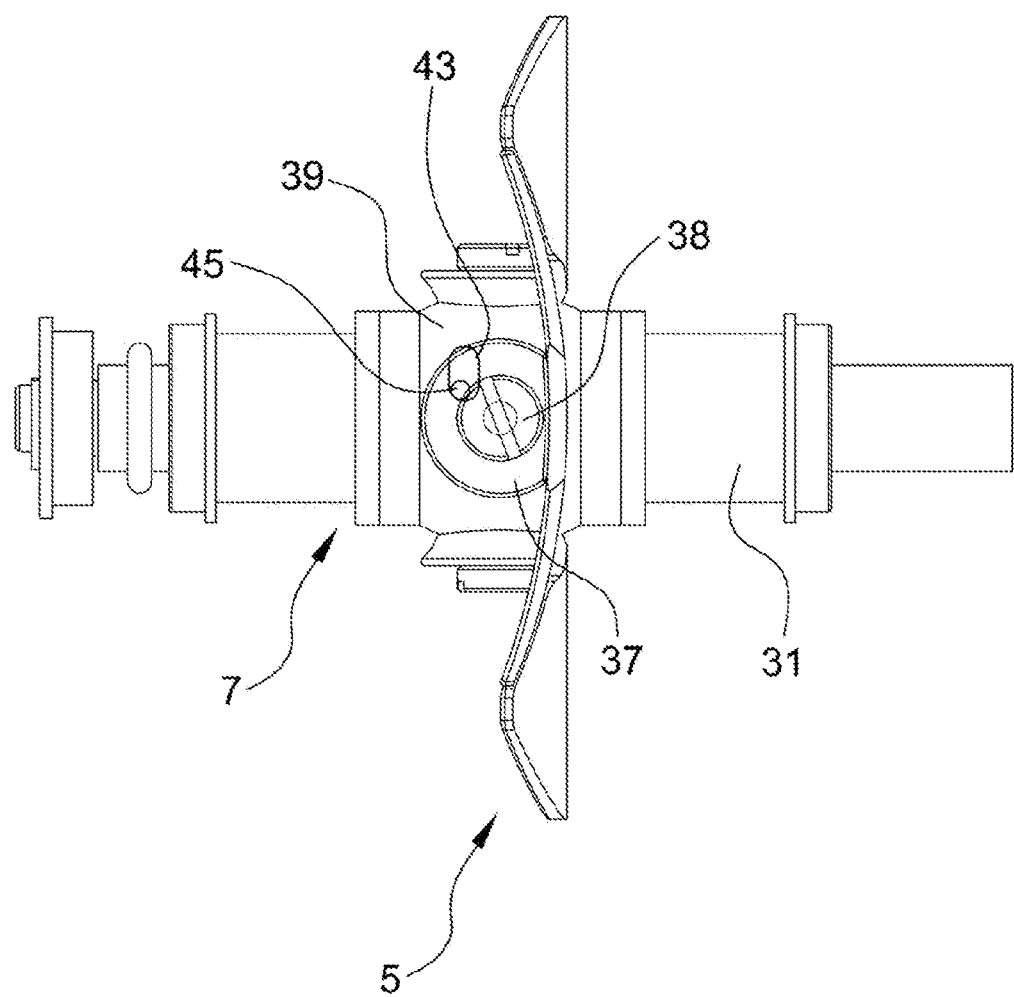
FIG. 7 is an exemplary view illustrating the operation of the rotation axis and rotary blade shown in FIG. 4, wherein the angle of attack of the rotary blade is set to 0 degrees.
Figure 8:
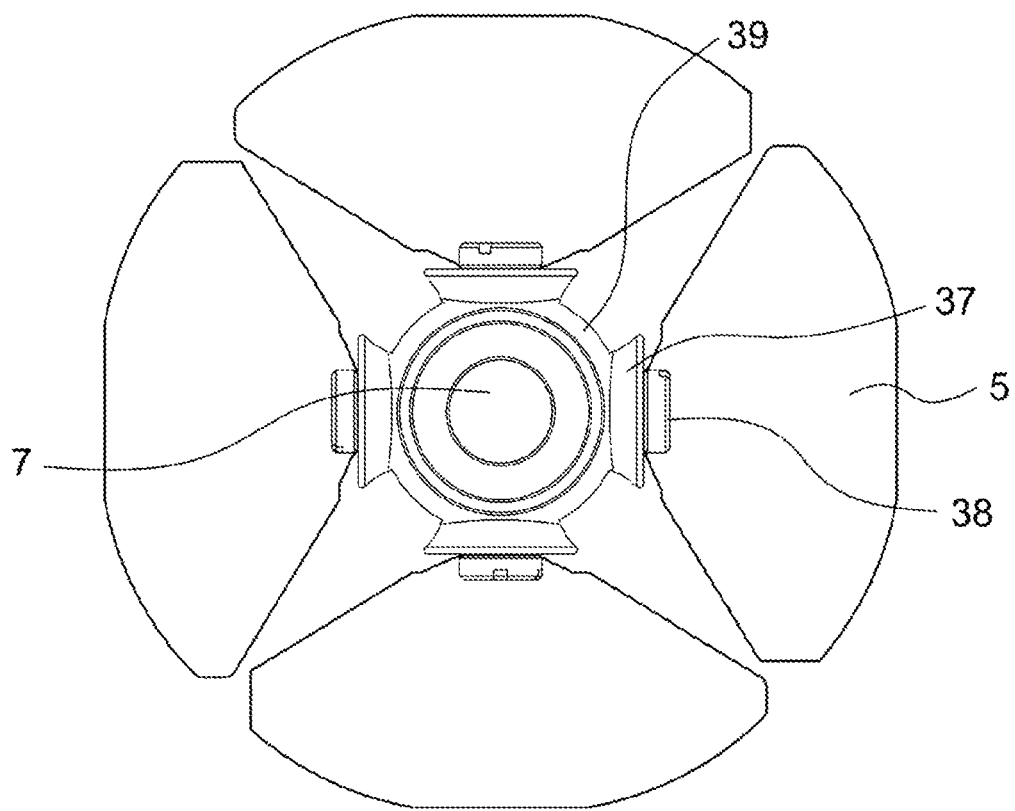
FIG. 8 is a left side view of FIG. 7.

Conversely, when the angle of attack is maximized, for example at 0 degrees, each of the rotary blade 5 has a fan-shaped or trapezoidal planar shape, as shown in FIGS. 7 and 8, so that they can rotate within the hydraulic chamber C without causing mutual interference on the rotational plane. In this case, the rotary blade 5 presents the least shear resistance to the resistive fluid and thus generates the least drag power.

The rotary shaft 7 is a means for rotatably supporting the rotary blade 5 in the hydraulic chamber C, and is rotatably disposed in the housing 3 along an axial line of the housing 3, as shown in FIGS. 4 and 5.

In particular, the rotation shaft 7 comprises an outer shaft portion 31, an inner shaft portion 33, and a blade pivot 35 so that the angle of attack can be changed as above by rotating the rotary blade 5 around the normal of the rotary shaft 7.

Here, the outer shaft portion 31 is a part forming the outer body of the rotary shaft 7, and is formed in pairs so as to be symmetrically oriented to extend along the axis of the rotary shaft 7, as shown in FIGS. 4 and 5, and is connected together through the shaft housing 39 in the middle. Furthermore, the outer shaft portion 31 is hollow so as to surround the inner shaft portion 33 for the most part, and is rotatably supported on the housing 3 at both its front and rear ends by clutch rollers, bearings, and the like. In this case, one end of the outer shaft 31, i.e., the front end, is exposed through the center of the housing 3 body 21 and is coaxially fitted to the spool 10.

The inner shaft portion 33 is the portion forming the core of the rotary shaft 7, and as shown in FIGS. 4 and 5, likewise extends along the axis of the rotary shaft 7, but the entirety, including the front end, is reciprocally inserted into the inner space of the outer shaft portion 31 in a relative movement along the axis. However, the rear end penetrates the housing 3 lid 23 rearwardly and is connected to the knob 9. It is reciprocally moved back and forth by the knob 9. At this time, the rotary shaft 7 is formed by screwing the front female rod and the rear male rod coaxially together.

The blade pivot 35 is a means for rotating the rotary blade 5 so that the angle of attack is changed according to the reciprocating motion of the inner shaft portion 33, and is a bar rotatably secured in the middle of the outer shaft portion 31 and is rotatably connected to the inner shaft portion 33 by a cylindrical shaft housing 39, as shown in FIGS. 4 and 5. In other words, the blade pivot 35 is connected to the rotary blade 5 peripheries 37 on one side by a set screw 38, and a radially protruding head 36 on the other side is constrained by the shaft housing 39 and connected to the inner shaft portion 33.

At this time, the blade pivot 35 is rotated in the reverse direction by the inner shaft portion 33 when the inner shaft portion 33 reciprocates relatively within the outer shaft portion 31, thereby converting the linear motion of the inner shaft portion 33 into a rotational motion of the rotary blade 5, changing the angle of attack of the rotary blade 5. For this purpose, the inner shaft portion 33 includes an angular ring 41 and a pressurization groove 43, for example, as shown in FIGS. 4 and 5, and the wing pivot 35 includes a hydraulic projection 45.

Here, the angular ring 41 is angled and protrudes radially from the inner shaft portion 33 to form a tangentially flat surface to create a pressurization groove 43 on the outer circumferential surface of the inner shaft portion 33 facing the blade pivot 35. Furthermore, the pressurization groove 43 has the form of a slot that is impressed in the normal direction of the inner shaft portion 33 in the flat surface of the above-mentioned angular ring 41 for insertion of the hydraulic protrusion 45, but is elongated in the tangential direction of the inner shaft portion 33 to allow movement of the hydraulic protrusion 45 in the tangential direction of the inner shaft portion 33.

Furthermore, the blade pivot 35 has a hydraulic projection 45 projecting on its inner surface facing the inner shaft portion 33, as shown in FIGS. 4 and 5, in which hydraulic projection 45 is fitted into the pressurization groove 43 as described above, causing the blade pivot 35 to rotate as it rides in the pressurization groove 43 in accordance with the back and forth movement of the pressurization groove 43, i.e., the axial reciprocating movement of the inner shaft portion 33, thereby causing the rotary blade 5 to rotate.

The knob 9 is an adjustment handle for changing the angle of attack of the rotary blade 5 via the rotation shaft 7, as shown above, and is coupled to a screw 49 at the rear end of the housing 3, so that when rotated by a user applying an external force, the housing 3 is moved axially forward and backward, as shown in FIGS. 3 to 5.

For this purpose, the knob 9 comprises a body 50, a flanged bearing 51 and a retainer 53, as shown in FIGS. 4 and 5. The body 50 is screwed to the periphery of the rear end of the housing 3, i.e., around the periphery of the lid 23 on the other side of the spool 10. Thus, the body 50 moves back and forth along the axis of the housing 3 when gripped by the user and screwed in the reverse direction. Meanwhile, the knob 9 is rotatably supported on the rotary shaft 7 by a flange bearing 51, which is threaded into the center of the body 50 to rotatably support the rear end of the inner shaft portion 33 relative to the body 50, as shown in FIGS. 4 and 5.

In addition, a retainer 53 is mounted to the rear end of the inner shaft 33 to permit relative rotation of the inner shaft portion 33 with respect to the flange bearing 51, but to constrain the inner shaft portion 33 from axial relative movement with respect to the flange bearing 51 and the body 50.

When the body 50, i.e., the knob 9, is screwed back and forth, the inner shaft portion 33 is interlocked to move back and forth, thereby allowing the inner shaft portion 33 to move back and forth relative to the outer shaft portion 31.

Thus, when the knob 9 is adjusted by an external force, it is disconnected from the rotation of the rotary shaft 7 and only rotates along the screw 49, but by moving axially back and forth with respect to the housing 3 in accordance with the rotation of the screw, it causes the inner shaft portion 33 to move relative to the outer shaft portion 31 in the axial direction of the rotary shaft 7, and consequently adjusts the angle of attack of the rotary blade 5.

The action of the dragging device of a fishing reel using fluid resistance according to a preferred embodiment of the present invention will now be described as follows.

Figure 6:
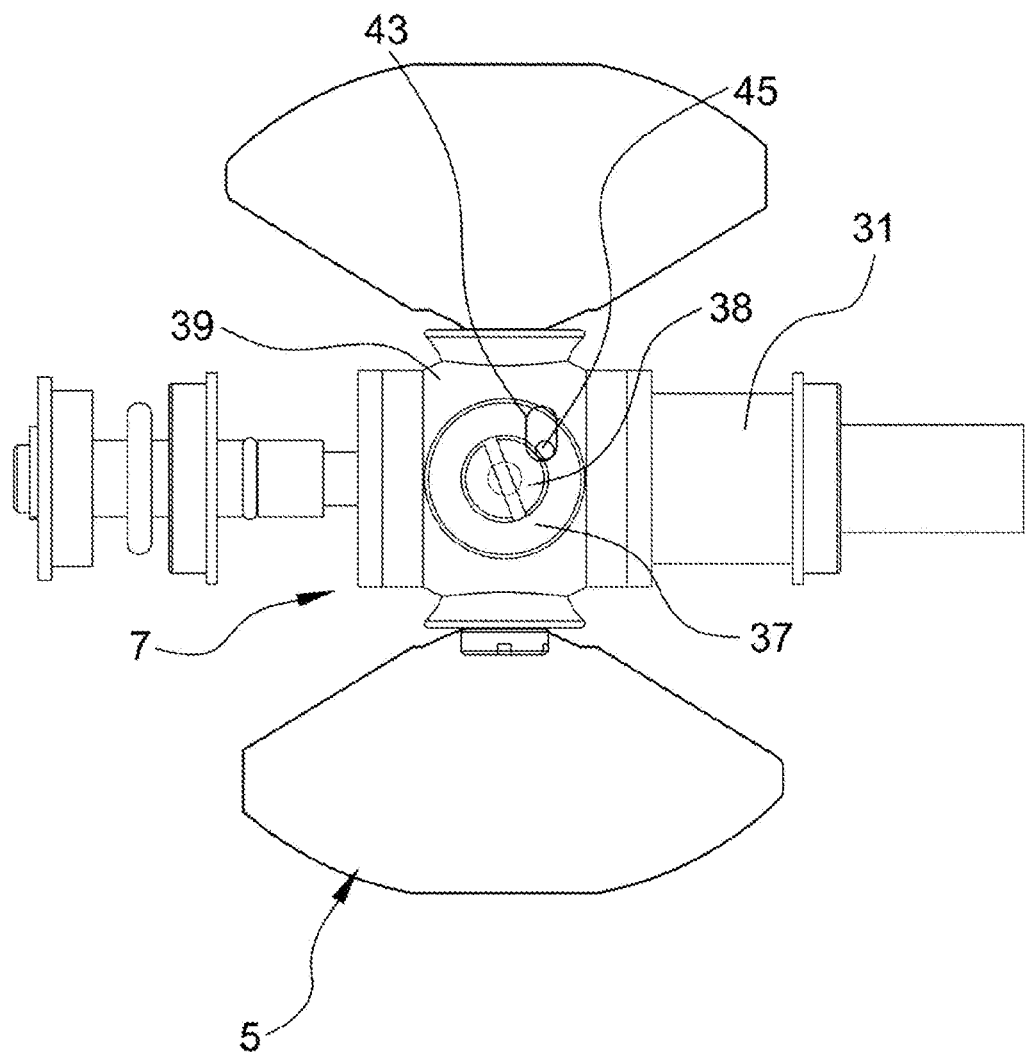
FIG. 6 is an illustration of the operation of the rotary shaft and rotary blade shown in FIG. 4, wherein the angle of attack of the rotary blade is set to 90 degrees.

According to the drag device 1 of the present invention, when the inner shaft portion 33 is maximally advanced by the rotation of the knob 9, as shown in FIGS. 4 and 6, the pressurized groove 43 moves the hydraulic protrusion 45 to the forefront.

At this time, the angle of attack of the rotary blade 5 that is, the angle of the rotary blade 5 to the line perpendicular to the axial line of the rotary shaft 7, becomes 90 degrees, and the rotary shaft 7 is subjected to the maximum resistance of the resistive fluid to the rotation of the rotary shaft 7 in the hydraulic chamber C.

Conversely, when the inner shaft portion 33 is maximally retracted, as shown in FIG. 7, the pressurization groove 43 moves the hydraulic protrusion 45 to the rear, so that the rotary blade 5 rotates counterclockwise, and the angle of attack is 0 degrees. Thus, the rotary shaft 7 rotates in the hydraulic chamber C with minimal resistance from the resistive fluid.

In this way, the user can adjust the resistance of the resistive fluid to the rotation of the rotary shaft 7, i.e., the drag power of the reel, by changing the angle of attack of the rotary blade 5 by rotating the knob 9.

At this time, the rotating shaft 7 is connected to the spool 10 of the reel, that is, the disk to which the spool is attached, through the one-way roller bearing 20, as shown in FIGS. 3 to 5. In the one-way roller bearing 20, when the spool 10 rotates counterclockwise from the front, that is, when viewed from the right side of the drawing, only the outer housing 3 rotates so that no drag is applied to the rotary shaft 7. Therefore, if the counterclockwise direction is set as the fishing line retrieval direction, the user can easily retrieve the fishing line.

On the other hand, when the spool 10 rotates clockwise when viewed from the front, the one-way roller bearing 20 rotates with the rotary shaft 7 as a whole, so that a strong drag is generated depending on the angle of attack of the rotary blade 5. Therefore, by setting the clockwise direction as the fishing line release direction, the user can apply a strong brake on the unwinding of the fishing line according to the set drag power.

Naturally, the user will then be able to set the desired braking force or drag power of the reel, on the unwinding of the fishing line by changing the angle of attack of the rotary blade 5 through rotational adjustment of the knob 9, as previously described.

In particular, when the drag device 1 of the present invention employs a resistive fluid such as a viscous fluid as a resistance element against rotation of the rotary shaft 7 and the rotary blade 5, even when the drag power is set to the maximum, since the resistive fluid is a viscous fluid, When rotating the rotary blade 5 and the rotary shaft 7 slowly, rotation is allowed to some extent, and even if the fishing line is pulled strongly, if the rotational acceleration is lowered, that is, if the pulling force does not increase rapidly, the shear resistance of the resistive fluid to the rotary blade 5 is lowered, and the fishing line is gradually released. Therefore, the drag device 1 can reduce the stiffness of the drag and thus prevent the phenomenon of stick slip.

While specific embodiments of the invention have been described above by way of example, they are for illustrative purposes only and are not intended to limit the scope of protection of the invention. That various substitutions, modifications, and changes are possible without departing from the technical idea of the invention will be apparent to one having ordinary knowledge in the technical field to which the invention belongs.

INDUSTRIAL AVAILABILITY

According to the drag device of a fishing reel utilizing fluid resistance of the present invention, a drag power is generated by the shear resistance of the resistive fluid generated when the rotary blade of the rotary shaft connected to the spool rotates between the rotary blade and the resistive fluid surrounding it in the hydraulic chamber, so that the frictional resistance generated inside the device can be greatly reduced, and thus the damage or failure of the device can be greatly reduced, as well as the usable life can be greatly increased.

The invention claimed is:

1. A drag device for a fishing reel using fluid resistance, comprising:
   a housing (3) forming an outer body;
   a resistive fluid charged in a hydraulic chamber (C) within the housing (3);
   a rotary blade (5) rotatably embedded in the hydraulic chamber (C) with the resistive fluid;
   a rotary shaft (7) rotatably supported on the housing (3), rotatably supporting the rotary blade (5) within the hydraulic chamber (C); and
   a knob (9), mounted on one side of the housing (3) for engagement with one end of the rotary shaft (7), for adjusting an angle of attack of the rotary blade (5) when rotated by an external force,
   wherein, when a rotational torque greater than a predetermined drag power is applied to a spool (10) of a fishing reel axially coupled to the rotary shaft (7), the rotary blade (5) is adapted to rotate with the spool (10) in the direction of unwinding the fishing line while overcoming the fluid resistance of the resistive fluid,
   wherein the rotary blade (5) is adapted to set a drag power to resist unwinding of the spool (10), by adjusting the angle of attack.

2. The drag device of claim 1, wherein the rotary shaft (7) comprises:
   an outer shaft portion (31) extending along an axis of the rotary shaft (7), rotatably supported on the housing (3) at both ends, so that one end is exposed out of the housing (3) towards the spool (10);
   an inner shaft portion (33) inserted within the outer shaft portion (31) and connected at one end to the knob (9), wherein the inner shaft portion (33) is movable back and forth along an axial line by the knob (9) which is movable back and forth by an external force; and
   a blade pivot (35) rotatably mounted in a middle of the outer shaft portion (31), connected on one side to a blade root (37) of the rotary blade (5) and on the other side to the inner shaft portion (33).

3. The drag device of claim 2, wherein the knob (9) comprises:
   a body (50) moving back and forth along the axial line in forward and reverse rotation;
   a flange bearing (51) centered in the body (50), rotatably supporting the inner shaft portion (33) with respect to the body (50); and
   a retainer (53) mounted at an end of the inner shaft portion (33) to permit relative rotation of the inner shaft portion (33) about the flange bearing (51), but to constrain axial relative movement of the inner shaft portion (33), thereby causing the inner shaft portion (33) to move back and forth relative to the outer shaft portion (31) in coordination with back and forth movement of the body (50).

4. The drag device of claim 3, wherein the resistive fluid is a viscous fluid.

5. The drag device of claim 2, wherein the blade pivot (35) is rotated by the inner shaft portion (33) as the inner shaft portion (33) moves relative to the outer shaft portion (31), thereby converting linear motion of the inner shaft portion (33) into rotational motion of the rotary blade (5) and thereby changing the angle of attack of the rotary blade (5).

6. The drag device of claim 5, wherein the resistive fluid is a viscous fluid.

7. The drag device of claim 2, wherein the resistive fluid is a viscous fluid.

8. The drag device of claim 1, wherein the resistive fluid is a viscous fluid.

* * * * *